April 9, 1963  J. B. McGAY  3,084,904
SWINGING GATE VALVES
Filed March 4, 1957  2 Sheets-Sheet 1
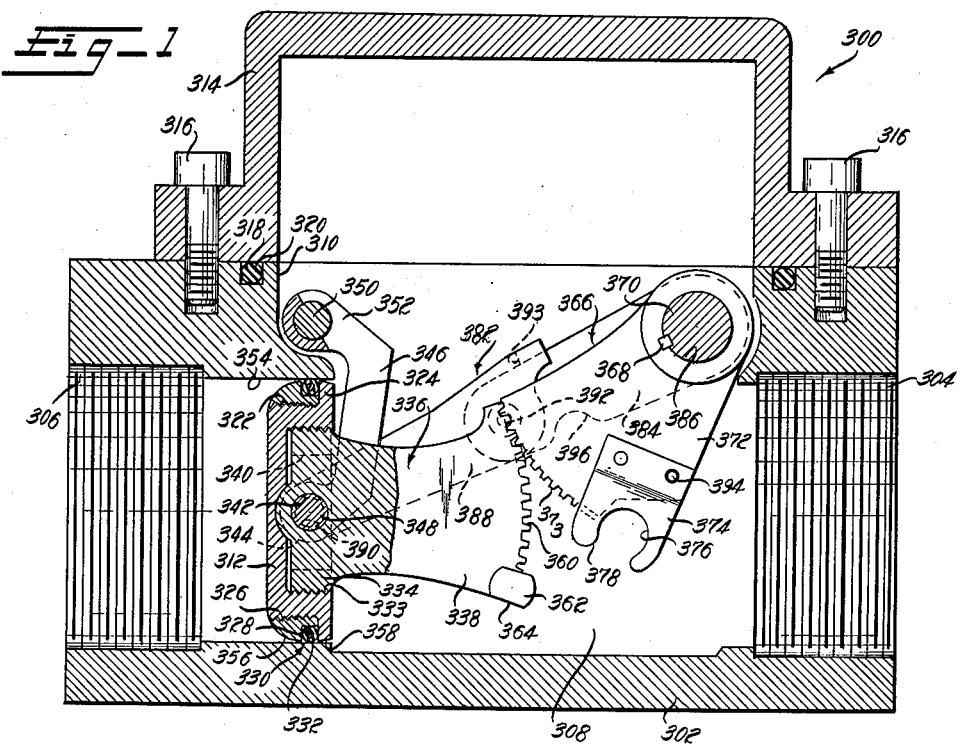
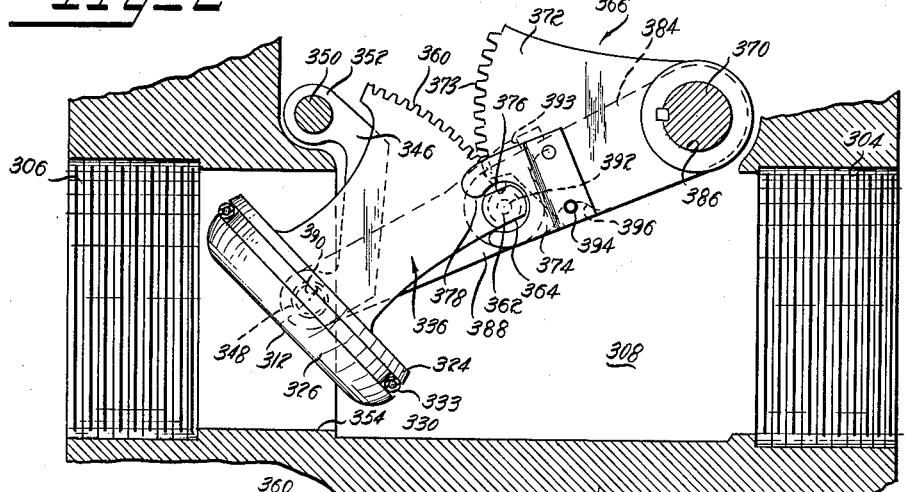
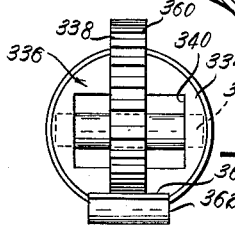
INVENTOR
JOHN B. McGAY
BY
Strauch, Nolan & Neale
ATTORNEYS April 9, 1963  J. B. McGAY  3,084,904
SWINGING GATE VALVES
Filed March 4, 1957  2 Sheets-Sheet 2
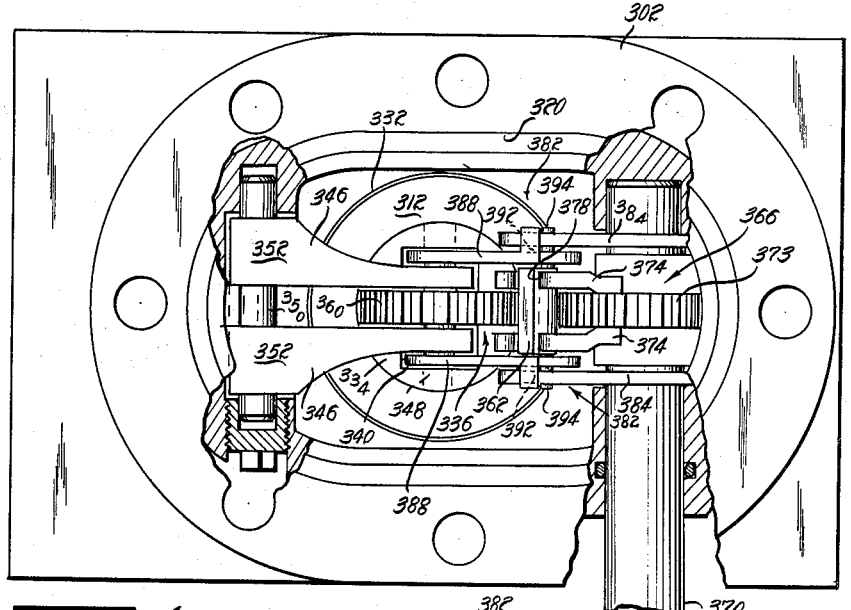
Fig-4
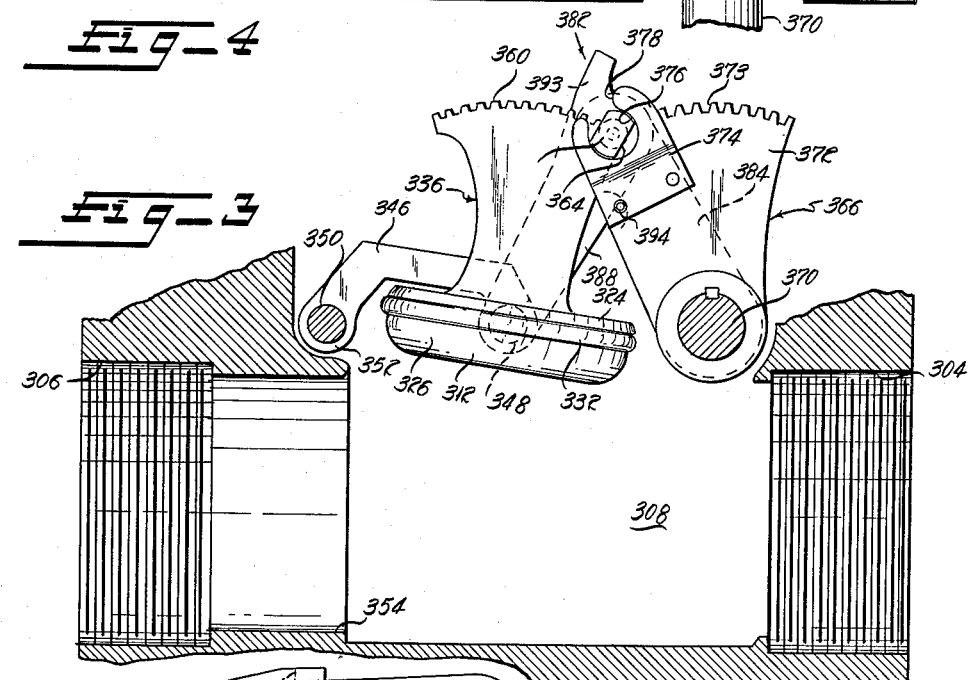
Fig-3
Fig-5  Fig-6
INVENTOR
JOHN B. McGAY
BY Strauch, Nolan & Nolan
ATTORNEYS

United States Patent Office 3,084,904
Patented Apr. 9, 1963

3,084,904
SWINGING GATE VALVES
John B. McGay, 1551 S. Yorktown Place, Tulsa 4, Okla.
Filed Mar. 4, 1957, Ser. No. 643,847
6 Claims. (Cl. 251—218)

This invention relates to improvements in swinging gate valves and is more particularly related to improved swinging gate valves with operating controls utilizing toggle actuating linkage.

Generally, this invention proposes gate valves in which a valve body contains a combination butterfly and swinging gate movable into a ring seat, aligned with an inlet port. Movement of the swinging gate is accomplished by a mechanical movement including an internal toggle linkage. In swinging the gate to an open position, the control linkage and the gate are retracted entirely out of a straight through fluid flow path. Although ground metal valve seat surfaces may be used, it is proposed to use metal cored flexible O-rings to obtain the sealed seating between the gate and the ring seat thus eliminating expensive seating machining operations. The gate control linkage is so arranged to provide an initial butterfly valve action by the gate to relieve high pressures on the gate after which initial movement, the control linkage becomes a toggle actuator to swing the control linkage and valve gate out of the straight through flow valve cavity.

Accordingly a primary object of this invention resides in providing novel swinging gate valves in which the gates have a full swinging movement out of a straight through flow path.

Another object resides in providing novel swinging gate valves having mechanism, for closing the gate against line pressure, which includes a toggle mechanism for rapidly multiplying lever advantage as the gate approaches closed position.

A further object resides in the provision of a swinging gate valve having a mechanical path of movement which permits swinging movement into a tapered seat without binding. In accomplishing this object without the need of expensive machining operations the novel movable gate includes an O-ring seal provided with a metal core enabling highly satisfactory operation at ordinary operating ranges of temperature. At the expense of higher costs, metal to metal lapped seating surfaces can be used for higher operating ranges of temperature.

Still another object resides in providing operating means that will enable the actuating linkage to be maintained in a position with the gate partially open to provide a throttling action through the valve.

Another object resides in providing a novel gate valve having actuating linkage to swing the gate in the manner of a butterfly valve during initial opening or final closing movement, and the remainder of gate movement is accomplished by a toggle actuating linkage to swing the gate and all actuating linkage away from a straight through flow path through the valve.

Still another object resides in providing a novel conjoint actuating linkage capable of imparting sequential butterfly valve actuation and swinging actuation to the gate of a swinging gate valve. Together with this object an auxiliary toggle linkage is provided to maintain the gate in proximity to the valve seat when the gate is in closed position and during intermediate butterfly actuation.

Further novel features and objects of this invention will become apparent from the detailed description and appended claims taken in conjunction with the accompanying drawings in which:

FIGURE 1 is a side view in section, illustrating a swinging gate valve with modified actuating linkage which enables the valve gate to be swung on a diametral axis through an initial increment of movement and swung about an offset axis during the remainder of the gate movement, the gate being shown in seated position;

FIGURE 2 is a partial side view of the valve shown in FIGURE 1, showing the gate swung through a 45° angle and the transition of the actuating linkage from meshed gear segments to a toggle linkage;

FIGURE 3 is a partial side view of the valve shown in FIGURE 1 after the actuating linkage has moved the gate to a fully open and withdrawn position by toggle action;

FIGURE 4 is a top plan view of the FIGURE 1 valve with the gate positioned as in FIGURE 3, the valve bonnet being removed;

FIGURES 5 and 6 are respective side and plan views of the auxiliary toggle locking linkages used in the valve of FIGURE 1; and FIGURE 7 is an end view of the gear segment screw plug which is threaded in the valve gate, as shown in FIGURE 1.

FIGURES 1-7 illustrate a swinging gate valve 300 in which the initial opening movement of the gate occurs as a diametral swinging of the gate in the manner of a butterfly valve and thereafter the gate and actuating members are withdrawn to leave an unobstructed, straight through, full open path between valve ports. The initial butterfly gate action eliminates the high pressure forces on the unlocked toggle mechanism upon opening of the gate and also greatly reduces the torque required to close the gate against line pressure because of the balanced valve characteristics of butterfly type gate action.

The valve body 302 has aligned ports 304 and 306 with suitable connections for inlet and outlet pipes (not shown). Intermediate the two ports 304 and 306 is a valve gate cavity 308 with an opening 310 at the top enabling assembly of the gate 312 and actuating linkage (to be described) in the valve body and permitting operational withdrawal of the linkage and gate assembly from the portion of the valve gate cavity between ports 304 and 306. A valve bonnet 314 covers the cavity opening 310 and is fastened to valve body 302 by bolts 316. A seal ring 318, disposed in an annular groove 320 surrounding opening 310 in body 302, coacts with the bonnet 314 to form a fluid tight closure joint.

Valve gate 312 is circular and has a threaded peripheral cylindrical portion 322 terminated in an annular radial flange 324. A retainer ring 326 with a stepped periphery 328 is threaded on the periphery of gate 312 against the radial flange 324 providing an annular ring seal retaining groove 330 in the gate periphery. The retainer ring construction is used to enable installation of a metal cored O-ring 332 when such a seal is used in the gate periphery. If a flexible O-ring is used in lieu of the metal cored O-ring, the retainer ring 326 can be omitted and the seal ring groove machined directly in the periphery of the gate.

The right hand face of gate 312 (FIGURE 1) is countersunk with a large diameter internally threaded blind bore 333 and the threaded plug end 334 of a lever 336 is secured therein. Lever 336 has a central extension 338 and on each side of the extension 338 the plug end 334 is apertured at 340, the apertures being diametrically disposed. A diametrical bore 342 through the plug end 334 intersects both apertures 340. The lower apertured ends 344 of a pair of suspension bars 346 fit freely within associated apertures 340 and are pivotally connected to the plug end of lever 336 by a pivot pin 348 disposed in bore 342. FIGURE 7 shows an end view of lever 336 with the pivot pin 348 in position.

When the two suspension bars 346 are connected to lever 336 by pin 348, the plug end 334 of the lever 336 can be threaded tightly in the bore 333 of gate 312, locking pin 348 in position, and the assembly pivotally suspended in the valve body 302 by a pin 350 which is located above the flow path between ports 304 and 306. Pin 350 projects through the apertured upper ends 352 of the suspension bars 346 and the pin is suitably mounted in sockets in body 302 (see FIGURE 4). Suspension bars 346 support the gate 312 for arcuate swinging movement about the axis of pin 350 and for diametral gate pivoting movement about the axis of pin 348.

With the suspension bars 346 and gate 312 disposed as shown in FIGURE 1, the O-ring 332 in the periphery of gate 312 sealingly engages the surface of the valve body seat 354 which, in its simplest form, can be cylindrical. The peripheral edges 356 and 358 of the gate on each side of annular groove 330 can be tapered or shaped as a spherical section to enable the diametral gate pivot movement to the position shown in FIGURE 2. The rear end of lever extension 338 is formed with gear teeth 360 and provides a rigid gear sector on gate 312, the gear teeth being formed on a circular arc, the center of which lies on the axis of pivot pin 348. Adjacent the lower portion of the gear teeth 360 are two lateral pin projections 362 (see FIGURE 7) with flat sides 364 which are essentially parallel to a plane through the projections 362 and the axis of pin 348.

The axis of pin projections 362 is preferably normal to the pitch circle of the gear teeth 360.

A second lever 366 is fixed by a key 368 to an operating shaft 370 which is journalled in valve body 302 above the entrance to the outlet port 306 and has one end projecting through the valve body to the exterior as shown in FIGURE 4. The end 372 of this second lever 366 is formed with gear teeth 373 on a circular arc of a radius equal to that of the gear teeth on lever 336 and the center of which lies on the axis of shaft 370. Gear teeth 373 mesh with the gear teeth 360 on lever extension 338 during a portion of the gate actuation.

On the sides of the lower portion of the toothed end 372 of lever 366, two matched plates 374 are fixed as by riveting. Each plate 374 has an open sided circular recess 376 with a diameter of sufficient dimension to permit pivotal movement of pin projections 362 therein. A line through the centers of the recesses 376 in the two plates 376 is normal to the pitch circle of the gear teeth. The width of the opening 378 into each recess is less than the recess diameter but is sufficiently large to pass over the flat sides of the pin projections 362 when the meshed levers reach a position as in FIGURE 2. As lever 366 is moved beyond a meshed tooth position and the plates 374 engage the pin projections 362, the plates 374 and pin projections provide a pivotal connection between levers 366 and 336 and, as shown in FIGURE 3, they become pivotally interlocked and cannot separate, until the levers are moved back to the meshed gear teeth position.

To prevent separation of the gear teeth sectors of levers 336 and 366 during the period of gate movement when the pin projections 362 are not interlocked in plates 374, a set of hinged links 382 are provided on each side of the levers 336 and 366. One of these links 382 is shown behind the levers in FIGURES 1, 2 and 3 and both are shown in FIGURE 4. Details of the links 382 are illustrated in FIGURES 5 and 6. Each set of links 382 includes a flat link 384, with a hole 386 at one end enabling pivotal disposal on operating shaft 370 at the sides of lever 366, and a second link 388 with a hole 390 at one end enabling pivotal disposal on pivot pin 348 in associated plug apertures 340 beside suspension bars 346. The two links 384 and 388 of each set are pivotally connected by an associated pin 392, the distances between the axis of pin 392 and the axes of holes 390 and 386 being equal to each other and to the radius of the pitch circle of the gear teeth on levers 336 and 366. Adjacent the pivoted connection between links 384 and 388, link 388 has an integral side lug 393 disposed to engage the top edge of link 384 when the center of holes 386 and 390 and pin 392 are aligned. Thus the link sets 382 can only scissor toward the bonnet 314. These link sets function to prevent gear tooth separation in the event of back pressure on the valve gate.

After the lever 366 has actuated the gate 312 through an approximately 45° tilt by gear tooth actuation, the pin projections 362 and interlocking plates 374 assume control of gate actuation and cause the withdrawal of the gate 312 into the upper portion of the valve body cavity 308 and bonnet 314. At this point in gate opening actuation the link sets 382 must start to hinge upward and, the centers of link holes 390 being coincident with the axis of gate pin 348 and centers of link holes 386 being coincident with the axis of shaft 370, the axis of link hinge pins 392 must coincide with the axis of interlocked pin projections 362 and plates 374. As the gate 312 moves, from a valve closed position, into the position shown in FIGURE 2, the axis of the pin projections 362 becomes coincident with the axis of the link set hinge pins 392. At this point, end extensions 394 of the lower rivets which fasten plates 374 to lever 366, engage the bottom edges of the links 384 and push the links upward to start their hinging movement. A small recess 396 in the bottom edges of links 384 enables proper cooperation with the rivet ends 394.

In operating the valve 300 from the closed position illustrated in FIGURE 1, operating shaft 370 is rotated clockwise by a hand wheel or other suitable operator. This rotation, through lever 366 and the meshed gear teeth between lever 366 and gate lever 336 will rotate gate 312 on the diametral axis of pin 348 until gate 312 reaches the position illustrated in FIGURE 2. Should fluid pressure be acting against the gate 312 during this initial rotation, gate movement will not require a great amount of operating torque because the fluid pressure acting on the upper and lower portions of the gate 312 will balance about the axis of pin 348.

After the gate 312 has been rotated about 45° by the meshed gear teeth of levers 366 and 336, the pin projections 362 enter the recesses 376 of plates 374. Further rotation of operating shaft 370 and associated lever 366 causes the rivet ends 394 to push the hinged link sets 382 upward to enable link set hinge action and permit the withdrawal of gate 312 by articulated swinging on suspension bars 346. Full withdrawal of gate 312, levers 366 and 336, suspension bars 346 and link sets 382 into the upper portion of the valve body cavity 308 and bonnet 314 is illustrated in FIGURES 3 and 4. Note in FIGURE 3, a straight through, unobstructed flow path is thus provided between valve ports 304 and 306.

Valve closure is the reverse of that described for valve opening, the link sets 382 moving to a position where their pivot axes are aligned, at which point in the operation the gear teeth portions of the levers are enmeshed and butterfly type closure action is initiated to complete the gate closure from a position as in FIGURE 2 to that in FIGURE 1. A swinging gate closure movement up to the 45° open position of FIGURE 2 does not require too large an operating torque and butterfly action closure movement for the final 45° of gate travel, being essentially balanced does not require a high operating torque.

The valve has been described with the inlet port as arranged so that upstream line pressure creates a force tending to unseat the valve gate. It is to be understood that either port can serve as inlet or outlet although, as described, the valve will be easier to open with line pressure tending to aid in unseating the valve gate.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gate valve comprising: a valve body with inlet and outlet ports, an intermediate cavity and a ring seat adjacent the inner end of one of said ports; a chamber on one side of, and opening into, said cavity; gate means; support means pivotally mounted on said body and pivotally supporting said gate means for butterfly gate movement relative to said ring seat; and actuating means connected to said gate means for sequentially pivoting said gate means on said support means and swinging said gate means and support means from said cavity into said chamber.

2. A gate valve as defined in claim 1, wherein said ring seat is internally cylindrical, and said gate means is of piston form to sealingly fit in and with said ring seat.

3. A gate valve comprising: a valve body with inlet and outlet ports, an intermediate cavity and a ring seat adjacent the inner end of one of said ports; a chamber on one side of, and opening into, said cavity; gate means; suspension means pivotally mounted on said body including a pivotal connection to said gate means whereby said gate means can be suspended within said ring seat and pivoted on said suspension means to and away from a seated position on said ring seat; a rotatable operating member projecting into said valve body in sealed relation thereto; a first lever means, with a gear sector portion, fixed on said operating member internal of said valve body; a second lever means, with a gear sector portion, fixed on said gate means so said gear sector portion is adapted to be meshed with the gear sector portion of said first lever means during a predetermined increment of rotation of said first lever means whereby said gate means can be pivoted on said suspension means between a seated position and a partially open position; and separable pivotal connection means between said first and second lever means connectable at the end of movement of said gate means by said meshed gear sector portions and operable upon further movement of said first lever means to withdraw said gate means, suspension means and lever means into said chamber.

4. A gate valve comprising: a valve body with aligned inlet and outlet ports, a gate cavity therebetween and an internally cylindrical gate seat surrounding the inner end of one of said ports; piston form gate means having a circumscribing peripheral sealing means pivotally suspended from said body in said cavity shiftable between a sealed seating position in and with said gate seat and a position wholly removed from a straight through fluid flow path between said inlet and said outlet ports; actuating mechanism connected to move said gate means between said positions, said actuating mechanism including toggle linkage means and means to rotate the gate means with a butterfly valve action during initial opening and final closing movements of the gate means, said toggle linkage means adapted to actuate said gate means between the position where it has butterfly valve action and the position wholly removed from a straight through fluid flow path; and means in said valve body connected to operate said actuating mechanism.

5. A gate valve as defined in claim 4 wherein said toggle linkage means has a separable pivot connection which is disconnected during butterfly valve actuation.

6. A gate valve as defined in claim 5 wherein said actuating mechanism includes at least one auxiliary toggle link set connected between the valve body and said gate means to maintain the actuating mechanism in operable relation during the actuating periods when said toggle linkage means are disconnected.

References Cited in the file of this patent

UNITED STATES PATENTS

| | | |
|---|---|---|
| 599,099 | Hibbard | Feb. 15, 1898 |
| 828,236 | McElroy | Aug. 7, 1906 |
| 1,561,544 | How | Nov. 17, 1925 |
| 2,274,776 | Cull | Mar. 3, 1942 |
| 2,661,182 | Kipp | Dec. 1, 1953 |
| 2,704,650 | Rand | Mar. 22, 1955 |
| 2,804,880 | Rasmusson | Sept. 3, 1957 |

FOREIGN PATENTS

| | | |
|---|---|---|
| 19,589 | Great Britain | of 1892 |
| 669,260 | France | of 1929 |
| 802,855 | Germany | of 1951 |